United States Patent [19]
Takahashi

[11] Patent Number: 5,865,474
[45] Date of Patent: Feb. 2, 1999

[54] CLUSTER HOSE-PIPE CONNECTOR DEVICE CAPABLE OF CONCURRENT CONNECTION OF HOSES AND PIPES BY SINGLE RELATIVE MOVEMENT OF CONNECTOR HOLDER AND PIPE HOLDER

[75] Inventor: Akihiko Takahashi, Komaki, Japan

[73] Assignee: Tokai Rubber Industries, Ltd., Japan

[21] Appl. No.: 839,216

[22] Filed: Apr. 22, 1997

[30] Foreign Application Priority Data

Apr. 26, 1996 [JP] Japan ................................. 8-107135

[51] Int. Cl.$^6$ .................................................. F16L 39/00
[52] U.S. Cl. ................................. 285/124.1; 285/124.3; 285/124.4
[58] Field of Search ............................ 285/124.1, 124.2, 285/124.3, 124.4, 124.5, 118, 915, 120.1

[56] References Cited

U.S. PATENT DOCUMENTS

| | | | |
|---|---|---|---|
| 4,076,279 | 2/1978 | Klotz ................................... | 285/124.4 |
| 4,323,808 | 4/1982 | Shimizu ............................. | 285/124.5 |
| 4,804,208 | 2/1989 | Dye ..................................... | 285/124.4 |
| 4,900,065 | 2/1990 | Houck ................................. | 285/124.4 |
| 5,219,185 | 6/1993 | Oddenino ......................... | 285/124.1 |
| 5,297,820 | 3/1994 | Martin ................................ | 285/124.2 |

FOREIGN PATENT DOCUMENTS

| | | | |
|---|---|---|---|
| 3011226 | 10/1981 | Germany ............................. | 285/118 |
| 3529052 | 2/1987 | Germany ............................. | 285/118 |

*Primary Examiner*—Eric K. Nicholson
*Attorney, Agent, or Firm*—Parkhurst & Wendel, L.L.P.

[57] ABSTRACT

A hose-pipe connector device including (a) a hose connector holder including a first plate portion having openings, and first two leg portions extending from opposite ends of the first plate portion perpendicularly to the first plate portion, (b) connectors for connecting hoses to pipes, each connector having a hole and being fixed to the first plate portion, in engagement with one of the openings such that the hole is open in the direction of extension of the first leg portions, and (c) a pipe holder including a second plate portion and two second leg portions extending from opposite ends of the second plate portion perpendicularly to the second plate portion, and wherein the pipes are secured to a surface of the second plate portion such that the pipes extend perpendicularly to the longitudinal direction of the second plate portion and in parallel to the above-indicated surface, so that the holders are assembled together such that the first and second plate portions are perpendicular to each other, and such that the end portions of the pipes are inserted in the holes of the connectors while the first and second leg portions engage each other.

9 Claims, 4 Drawing Sheets

CLUSTER HOSE-PIPE CONNECTOR DEVICE CAPABLE OF CONCURRENT CONNECTION OF HOSES AND PIPES BY SINGLE RELATIVE MOVEMENT OF CONNECTOR HOLDER AND PIPE HOLDER

This application is based on Japanese Patent Application No. 8-107135 filed Apr. 26, 1997, the content of which is incorporated herein by reference.

BACKGROUND OF THE INVENTION

1. Field of the Invention

The present invention relates to a cluster hose-pipe connector device capable of concurrently connecting hoses to respective pipes by simple and quick manipulation of the device.

2. Discussion of the Related Art

For connecting a hose and a pipe to each other, there is known a connector which is connected at one end portion thereof to the hose and at the other end portion to the pipe. The hose is fixed to the connector with a suitable fastener such as a clamp or band disposed round the outer circumferential of the hose. The pipe is inserted at one end portion thereof into a pipe fitting hole formed through the above-indicated other end portion. As one type of this connector, there is widely used a connector which has at least one internal annular groove or recess open in the pipe filling hole, so that at least one annular protrusion formed on the outer circumferential surface of the corresponding end portion of the pipe is engageable with the annular groove or grooves of the connector when the end portion of the pipe is forced into the pipe fitting hole. Thus, the connector permits easy quick connection of the pipe to the hose connector, while preventing the removal of the pipe from the connector.

When two or more hoses are connected to respective pipes by using the conventional connectors, however, the procedure for the hose and pipe connection should be repeated for each of the individual sets of hoses and pipes one after another, and is accordingly cumbersome and time-consuming, leading to relatively low efficiency of the connecting operation. The connecting procedure is difficult particularly where the connection of the hoses and pipes should be achieved in a relatively narrow space working environment, as in the case of piping in an automotive vehicle, resulting in further reduction of the working efficiency and increased risk of erroneous or inadequate working and consequent failure to correctly connect the hoses and the pipes.

SUMMARY OF THE INVENTION

It is therefore an object of the present invention to provide a device capable of concurrently connecting a plurality of hoses to a plurality of pipes by simple manipulation and with improved efficiency, even where the connection should be effected in a narrow space.

The above object may be achieved according to the principle of the present invention, which provides a cluster hose-pipe connector device for connecting a plurality of hoses and a plurality of pipes, the connector device comprising: (a) a hose connector holder including a first plate portion, and a pair of first leg portions which extend from opposite longitudinal ends of the first plate portion in a first direction substantially perpendicular to a longitudinal direction of the first plate portion, the first plate portion having a plurality of openings formed through the first plate portion, each of the first leg portions having first engaging means; (b) a plurality of connectors for connecting the plurality of hoses and the plurality of pipes, each of the connectors having a pipe fitting hole and being fixed to the first plate portion, in engagement with a corresponding one of the openings, such that the pipe fitting hole is open in the first direction; and (c) a pipe holder including a second plate portion, and a pair of second leg portions which extend from opposite longitudinal ends of the second plate portion in a second direction substantially perpendicular to a longitudinal direction of the second plate portion, each of the second leg portions having second engaging means engageable with the first engaging means. The plurality of pipes are secured to a surface of the second plate portion such that the pipes extend perpendicularly to a longitudinal direction of the second plate portion and in parallel to the surface of the second plate portion. The hose connector holder and the pipe holder are assembled together such that a plane of the first plate portion is substantially perpendicular to a plane of the second plate portion, and such that the end portions of the pipes are inserted in the pipe fitting holes while the first and second engaging means engage each other.

In the cluster hose-pipe connector device of the present invention constructed as described above, the two or more connectors for connecting the hoses and the pipes are fixed to the hose connector holder, while the corresponding two or more pipes to be connected to the respective connectors are secured to the surface of the pipe holder. The pipes can be connected to the connectors by simply assembling the hose connector holder and the pipe holder, that is, by simply moving the two holders toward each other while the planes of the first and second plate portions of the holders are held perpendicular to each other, so that the end portions of the pipes are inserted into the pipe fitting holes in the respective connectors. With the two holders assembled together into the connector device, the first and second engaging means are held in engagement with each other to prevent removal of the two holders from each other. Thus, the present connector device permits easy, efficient and accurate connection of the hoses and pipes, at one time with one single movement of the two holders toward each other, even where the connection is required to be achieved in a relatively narrow space or working environment. Further, the present connector device permits easy removal of the holders from each other, that is, easy disconnection of the hoses and pipes at one time.

In one preferred form of the present invention, the first engaging means comprises a protrusion extending from each of the pair of first leg portions in the longitudinal direction of the first plate portion, while the second engaging means comprises means for defining a portion engageable with the protrusion. The protrusion may be a tab formed at the free end portion of each first leg portion. In this case, each second leg portion may have an aperture formed through the free end portion of the second leg portion. However, it is possible that each first leg portion has an aperture or recess while each second leg portion has a tab or protrusion.

In another preferred form of the invention, each of the plurality of openings is an elliptical hole having a minor dimension in a direction perpendicular to the longitudinal direction of the first plate portion, and a major dimension in the longitudinal direction of the first plate portion, which major dimension is larger than the minor dimension. In this instance, a part of the first plate portion defining each elliptical has a first engaging portion while each of the connectors has a second engaging portion which is engageable with the first engaging portion.

In one advantageous arrangement of the above preferred form of the invention, the second engaging portion has at least one recess which is formed in an outer circumferential surface of each connector and engageable with the first engaging portion. Each recess is partially defined by two shoulder surfaces which are opposed to each other in the above-identified first direction and which are inclined with respect to a plane parallel to the first plate portion, in respective opposite directions away from each other.

In an alternative advantageous arrangement of the above preferred form of the invention, the first engaging portion has at least one recess open in each elliptical hole, while the second engaging portion has at least one protrusion which is formed on an outer circumferential surface of each connector and engageable with the at least one recess. In this instance, too, each recess is partially defined by two shoulder surfaces which are opposed to each other the above-identified first direction and which are inclined with respect to a plane parallel to the first plate portion, in respective opposite directions away from each other.

In a further preferred form of the invention, the plurality of openings are arranged in a straight row parallel to the longitudinal direction of the first plate portion, while the plurality of pipes are arranged in a straight row parallel to the longitudinal direction of the second plate portion. The plurality of openings may be equally spaced apart from each other at a predetermined spacing pitch in the longitudinal direction of the first plate portion. In this case, the plurality of pipes are equally spaced apart from each other at the predetermined spacing pitch in the longitudinal direction of the second plate portion.

In a still further preferred form of the invention, the hose connector holder is made of a synthetic resin, while the pipe holder and the pipes are made of metallic materials.

Each connector may have a sealing member disposed in the pipe fitting hole, for securing fluid tightness between the connector and the pipe.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
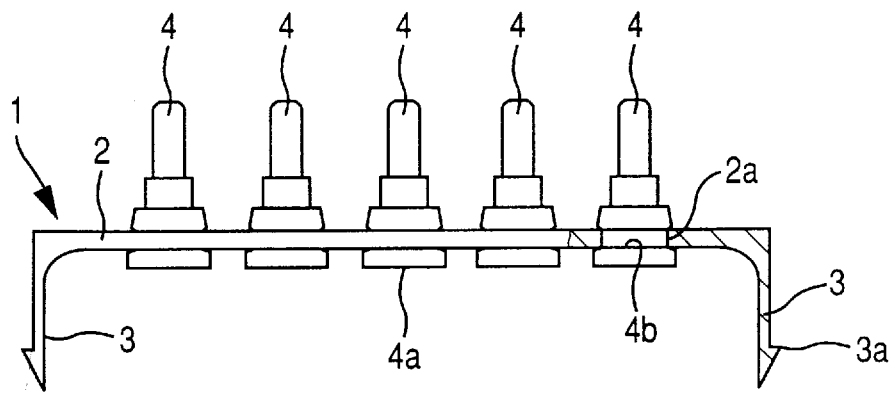
FIG. 1 is an elevational view partly in cross section, showing a hose connector holder in a cluster hose-pipe connector device constructed according to one embodiment of this invention.
Figure 2:
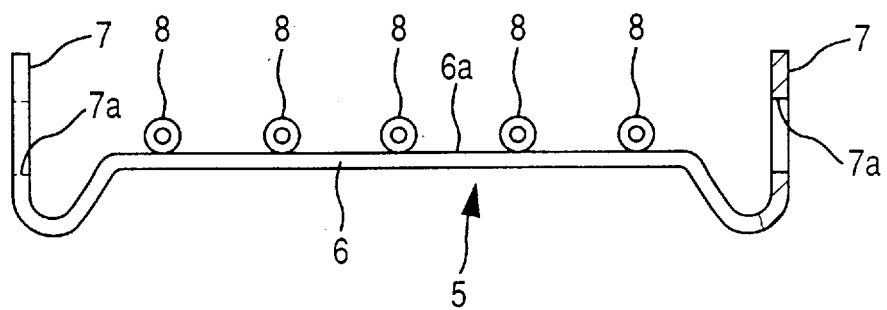
FIG. 2 a plan view partly in cross section, showing a pipe holder in the cluster hope-pipe connector device.

Referring to FIGS. 1–4, there will be described a cluster or gang hose-pipe connector device constructed according to a first embodiment of the present invention. This connector device includes a hose connector holder 1 for holding a plurality of hose connectors 4 as shown in FIG. 1, and a pipe holder 5 for holding a plurality of pipes 8 as shown in FIG. 2. As described below, the hose connector holder 1 and the pipe holder 5 are assembled together into the connector device, whereby the plurality of hose connectors 4 fixed to the hose connector holder 1 are connected at one time to the respective pipes 8 fixed to the pipe holder 5.

Figure 3:
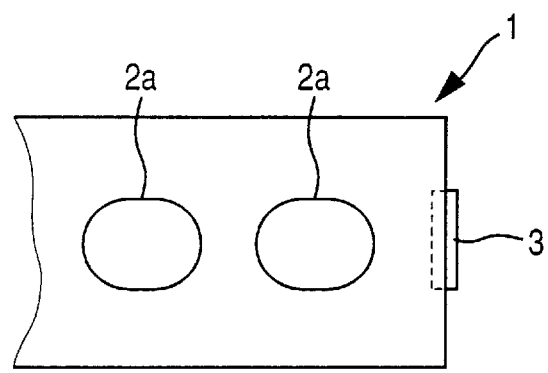
FIG. 3 is a fragmentary plan view schematically illustrating openings formed through the hose connector holder of FIG. 1.
Figure 4:
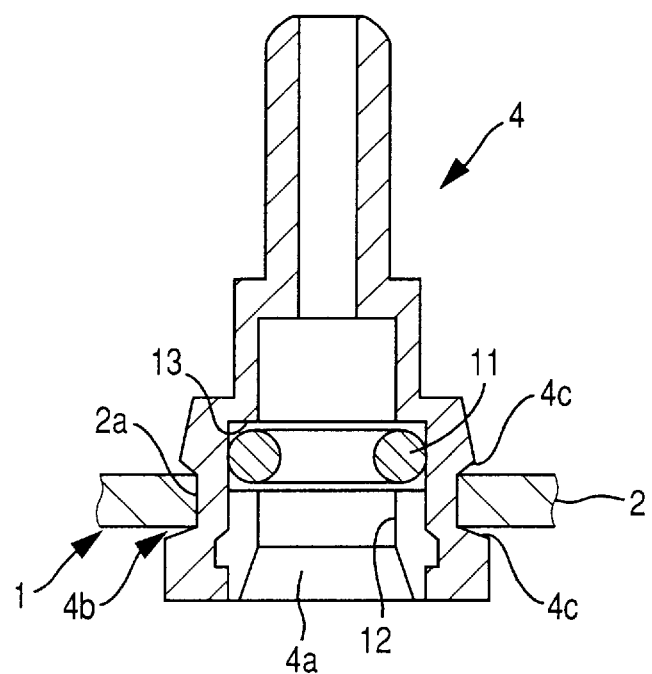
FIG. 4 is an elevational view in cross section showing one of hose connectors which is fixed to the hose connector holder through the corresponding opening.

Described in detail, the hose connector holder 1 includes a first plate portion 2 having a first engaging portion in the form of a plurality of openings 2a for holding the respective hose connectors 4. These openings 2a are formed through the plate portion 2 such that the openings 2a are arranged in a straight row in a longitudinal direction of the plate portion 2, as indicated in FIG. 3. Preferably, the openings 2a are equally spaced apart from each other in the longitudinal direction of the plate portion 2. Where the plate portion 2 has a relatively large width dimension (dimension in the direction perpendicular to the longitudinal direction), the openings 2a may be arranged in two or more straight rows. As described below, the connectors 4 are fixed by press-fitting to the plate portion 2 through the respective openings 2a. Various connectors known in the art may be used as the connectors 4. For permitting the connectors 4 to be fixed firmly to the openings 2a of the plate portion 2, it is desirable that each connector 4 has a second engaging portion in the form of an annular groove 4b which engages the opening 2a, as shown in FIG. 4. The connector 4 has a pipe fitting hole 4a in which one end portion of the corresponding pipe 8 is fluid-tightly inserted when the holders 1 and 5 are assembled into the connector device.

On the other hand, the pipe holder 5 includes a second plate portion 6 on which there are fixed the pipes 8 such that the outer circumferential surfaces of the pipes 8 are brazed or bonded by a suitable adhesive agent to a surface 6a of the plate portion 6. The pipes 8 are positioned relative to the plate portion 6 such that the pipes 8 extend in the transverse or width direction of the plate portion 6, and such that the pipes 8 are spaced from each other in the longitudinal direction of the plate portion 6 at the same spacing pitch as that of the connectors 4 fixed to the hose connector holder 1. Since the spacing interval between the adjacent pipes 8 is equal to that of the adjacent connectors 4, the pipes 8 can be connected to the respective connectors 4 at one time with a single movement of the holders 1, 5 toward each other. It is noted that the end portions of the pipes 8 to be inserted into the pipe fitting holes 4a extend beyond the plate portion 6 in the width direction of the plate portion 6. Namely, the length of the pipes 8 is larger than the width of the plate portion 6.

When the hose connector holder 1 with the connectors 4 and the pipe holder 5 with the pipes 8 are assembled together, the plate portion 2 of the hose connector holder 1 and the plate portion 6 of the pipe holder 5 are first positioned relative to each other such that the planes of these two plate portions 2, 6 are perpendicular to each other. In this condition, the relative positions of the pipe fitting holes 4a of the connectors 4 and the end portions of the corresponding pipes 8 as viewed in a plane parallel to the plane of the plate portion 1 are readily visible in the direction parallel to the plane of the plate portion 6 and in the direction of extension of the pipes 8. Thus, the holders 1 and 5 can be readily positioned to each other and assembled together, by the user of the connector device As shown in FIG. 3, each opening 2a formed through the plate portion 2 of the hose connector holder 1 is an elongate hole elongated in the longitudinal direction of the plate portion 2. For instance, the elongate hole 2a is an elliptical hole which has a major axis parallel to the longitudinal direction of the plate portion 2. That is, the dimension of the opening 2a in the longitudinal direction of the plate portion 2 is slightly larger than that in the width direction perpendicular to the longitudinal direction. On the other hand, the annular groove 4b of each connector 4 is partly defined by two shoulder surfaces 4c, 4c, as shown in FIG. 4. The shoulder surfaces 4c are spaced from each other by a suitable distance almost equal to the thickness of the plate portion 2. The shoulder surfaces 4c are inclined by a small angle with respect to a plane perpendicular to the longitudinal or axial direction of the connector 4, in the opposite directions away from each other, so that the annular groove 4b has a trapezoidal shape in cross section as shown in FIG. 4. The elliptical shape of the opening 2a and the slightly inclined shoulder surfaces 4c partially defining the annular groove 4b of the connector 4 are effective to absorb or accommodate positional errors of the annular groove 4b when the pipe 8 are connected to the connector 4.

The connector 4 has a maximum diameter which is slightly smaller than the major dimension of the elliptical hole 2a or opening of the plate portion 2, so that a light clearance is left between the outer circumferential surface of the connector 4 and the inner circumferential surface defining the elliptical opening 2a, in the longitudinal direction of the plate portion 2. Accordingly, the connector 4 is slightly movable and tiltable relative to the plate 2 in the longitudinal direction of the plate portion 2. The connector 4 is also slightly tiltable relative to the plate portion 2 in the width direction of the plate portion 2, in the presence of the slightly inclined shoulder surfaces 4c, 4c, as described above. Thus, the connectors 4 are slightly tiltable with respect to a plane parallel to the plane of the plate portion 2, so that the pipes 8 can be smoothly inserted into the pipe fitting holes 4a of the connectors 4, while assuring a high degree of fluid tightness between the connectors 4 and the pipes 8, even if the positions of the end portions of the pipes 8 fixed to the plate portion 6 of the pipe holder 5 deviate from the nominal positions corresponding to the positions of the connectors 4.

The insertion of the end portions of the pipes 8 into the pipe fitting holes 4a of the connectors 4 by moving the holders 1, 5 toward each other is facilitated by first pushing the ends of the pipes 8 into the end portions of the pipe fitting holes 4a while tilting the connectors 4 in various directions and/or moving the connectors 4 in the longitudinal direction of the plate portion 2. After the end portions of the pipes 8 have been inserted all the way into the holes 4a, the connectors 4 are rotated about their axes so as to be firmly fixed to the plate portion 2, namely, to the elliptical openings 2a.

The hose connector holder 1 further includes a pair of first leg portions 3 formed at the opposite longitudinal ends of the plate portion 2. Similarly, the pipe holder 5 has a pair of second leg portions 7 at the opposite longitudinal ends of the plate portion 6. The leg portions 3 and the leg portions 7 have fixing means for fixing together the hose connector holder 1 and the pipe holder 5. Described more specifically, each leg portion 3 has first engaging means in the form of an engaging tab 3a, while each leg portion 7 has second engaging means in the form of an engaging aperture 7a. These engaging tabs 3a of the leg portions 3 of the holder 1 and the engaging apertures 7a of the leg portions 7 of the holder 5 are engageable with each other when the holders 1, 5 are assembled together to provide the cluster hose-pipe connector device, by moving the holders 1, 5 toward each other. That is, the tabs 3a extending from the leg portions 3 in the longitudinal direction of the plate portion 2 are brought into the engaging apertures 7a formed through the leg portions 7. The width dimensions of the plate portion 2 and the leg portions 3 of the hose connector holder 1, and the width dimensions of the plate portion 6 and the leg portions 7 may be suitably determined, provided that the holders 1, 5 can be assembled together as needed. The width dimensions of the plate and leg portions 2, 3 may be the same as or different from those of the plate and leg portions 6, 7.

As indicated above, the holders 1, 5 are positioned relative to each other upon assembling thereof such that the plate portion 6 of the holder 5 is perpendicular to the plate portion 2 of the holder 1. For permitting engagement of the engaging tabs 3a and apertures 7a of the holders 1, 5, the leg portions 3 extend perpendicularly to the plate portion 2 in the direction on the side of the open end of the pipe fitting hole 4a, that is, in the direction opposite to the direction in which the connectors 4 generally extend from the plate portion 2. For the same reason, the leg portions 7 extend perpendicularly to the plate portion 6 in the direction on the side of the surface 6a to which the pipes 8 are fixed.

The holders 1, 5 may be made of suitably selected materials. Where the pipes 8 made of a metallic material are attached to the pipe holder 5 by a brazing or welding, the pipe holder 5 is required to be made of a metallic material. In the present embodiment wherein the holders 1, 5 are fixed together by the engaging tabs 3a and apertures 7a, the leg portions 3, 7 of the holders 1, 5 are required to exhibit a certain degree of elasticity that permits the tabs and apertures 3a, 7a to engage each other.

The present cluster hose-pipe connector device consisting of the hose connector holder 1 and the pipe holder 5 which have been described above permits concurrent and efficient connection of a plurality of hoses to the plurality of pipes 8 through the respective connectors 4, by simply assembling the holders 1, 5 in one single operation, without having to effect sequential connections of the pipes 8 to the connectors 4 one after another. The hoses may be connected to the respective connectors 4 either before or after the pipes 8 are connected to the connectors.

Figure 5:
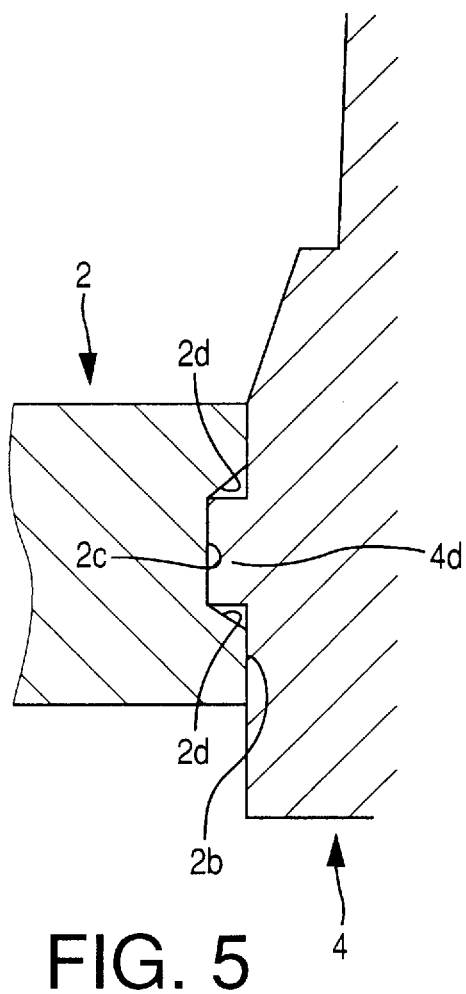
FIG. 5 is a fragmentary cross sectional view corresponding to that of FIG. 4, showing a connector fixed to a hose connector holder, in another embodiment of the present invention.

Referring next to FIG. 5, there is shown a hose connector holder 1 wherein each connector 4 has a second engaging portion in the form of an annular protrusion 4d, in place of the annular groove 4b provided in the first embodiment of FIG. 4, and the plate portion 2 has a plurality of elliptical holes or openings 2b for fixing the respective connectors 4. The inner circumferential surface defining each elliptical opening 2b has a first engaging portion in the form of an annular groove 2c for engagement with the annular protrusion 4d of the connector 4. The annular groove 2c is partially defined by two shoulder surfaces 2d, 2d which are spaced apart from each other by a distance almost equal to the thickness of the annular protrusion 4d of the connector 4. Like the shoulder surfaces 4c in the first embodiment, the shoulder surfaces 2d are inclined with respect to a plane perpendicular to the longitudinal or axial direction of the connector 4, in the opposite directions away from each other. In this second embodiment of FIG. 5, too, the connector 4 is slightly tiltable relative to the plate portion 2 with respect to a plane parallel to the plane of the plate portion 2.

EXAMPLE

Figure 6:
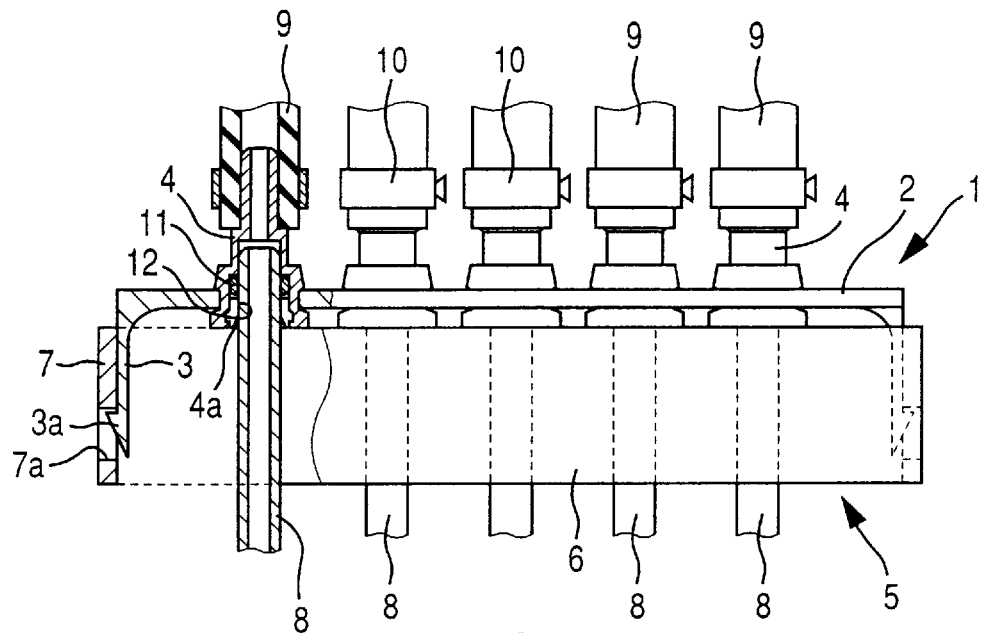
FIG. 6 is an elevational view partly in cross section, showing an example of the cluster hose-pipe connector device, which is obtained by assembling the hose connector holder of FIG. 1 and the pipe holder of FIG. 2.
Figure 7:
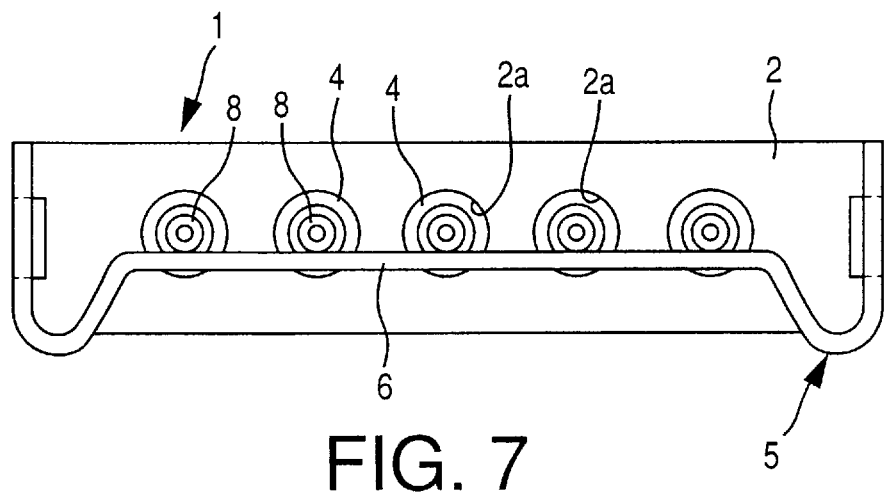
FIG. 7 is a bottom plan view of the cluster hose-pipe connector or device of FIG. 5.

Referring to FIGS. 6 and 7, there will be described a specific example of the cluster hose-pipe connector device of the present invention. It is noted that the same reference numerals as used in FIGS. 1–4 are used in FIGS. 6 and 7 to identify the same elements.

In the present example, the hose connector holder 1 is entirely made of a suitable synthetic resin, and its plate portion 2 has a width of 25 mm and a length of 100 mm. The five openings 2a are formed with a spacing pitch of 16 mm in the longitudinal direction of the plate portion 2. Each elliptical opening has a minor dimension of 10.5 mm in the width direction of the plate portion 2, and a major dimension of 11.5 mm in the longitudinal direction of the plate portion 2. The leg portions 3 formed at the opposite longitudinal ends of the plate portion 2 so as to extend at right angles to the plate portion 2 has a width of 10 mm, and a length of 20.5 mm (length of extension from the plate portion 2). As shown in FIG. 6, each leg portion 3 has the engaging tab 3a at its free end, which is engageable with the engaging aperture 7a formed through the corresponding leg portion 7 of the pipe holder 5.

The five connectors 4 fixed to the plate portion 2 through the respective openings 2a are made of a suitable synthetic resin, and have a diameter almost equal to the minor diameter of 10.5 mm of the openings 2a. When the connectors 4 are fixed to the plate portion 2, the connectors 4 are inserted through the openings 3a such that the pipe fitting holes 4a are open in the direction of extension of the leg portions 3, and such that the annular groove 4b of each connector 4 engages the edge portion of the corresponding opening 2a. Then, the connectors 4 are slightly rotated about their axes to prevent removal of the connectors 4 from the plate portion 2. The annular groove 4b is partially defined by a bottom surface, and two shoulder surfaces 4c, 4c which are formed at the opposite ends of the bottom surface and are inclined by approximately 2° with respect to to a plane perpendicular to the axis of the connector 4, in the opposite directions away from each other parallel to the axis of the connector 4.

Each connector 4 has an O-ring 11 for securing fluid tightness between the connector 4 and the corresponding pipe 8. The O-ring 11 is interposed between a collar 12 disposed in the end portion of the pipe fitting hole 4a, and an inner annular shoulder surface 13 (FIG. 4) formed in an intermediate portion of the hole 4a.

As shown in FIG. 6, hoses 9 are connected to the end portions of the connectors 4 remote from the pipe fitting holes 4a. For fixing the hoses 9 to the connectors 4, clamps 10 are disposed on the outer circumferential surfaces of the hoses 9. The clamps 10 may be bands or other fasteners.

The pipe holder 5 is made from a steel strip having a width of 20 mm and a thickness of 2 mm, by bending the opposite longitudinal end portions of the strip with respect to the intermediate portion at right angles to the intermediate portion, as shown in FIG. 7, so that the pipe holder 5 consists of the plate portion 6 and the leg portions 7. The pipe holder 5 is substantially U-shaped in cross section as seen in FIG. 7. Each leg portion 7 has the engaging aperture 7a engageable with the engaging tab 3a of the corresponding leg portion 3 of the hose connector holder 1.

The five pipes 8 corresponding to the respective connectors 4 are made of a metallic material and brazed at their outer circumferential surfaces to the surface 6a of the plate portion 6. The pipes 8 are positioned so as to extend in parallel to each other in the width or transverse direction of the plate portion 6, and are spaced apart from each other in the longitudinal direction of the plate portion 6, at a spacing pitch of 16 mm which is the same as that of the connectors 4. The end portions of the pipes 8 which are to be inserted into the pipe fitting holes 4a of the respective pipes 8 extend beyond the plate portion 6, and are allowed to be inserted into the holes 4a.

Since the major dimension of each elliptical opening 2a is larger than the maximum diameter of the connector 4 and since the shoulder surfaces 4c of the annular groove 4b are inclined, the connector 4 is slightly movable relative to the plate portion 2 in the longitudinal direction of the plate portion 2 and is slightly tiltable with respect to the plate portion 2. This arrangement permits easy insertion of the end portions of the pipes 8 into the pipe fitting holes 4a in the connectors 4, upon assembling of the holders 1, 5, even in the presence of certain degrees of relative positional errors associated with the connectors 4 and pipes 8.

With the end portions of the pipes 8 suitably inserted into the pipe fitting holes 4a of the connectors 4, the first engaging means in the form of the engaging tabs 3a and the second engaging means in the form of the engaging apertures 7a engage each other, whereby the holders 1, 5 are fixed together into the cluster hose-pipe connector device in which the plate portion 2 of the hose connector holder 1 is perpendicular to the plate portion 6 of the pipe holder 5, as shown in FIGS. 6 and 7.

While the presently preferred embodiments of this invention has been described above by reference to the accompanying drawings, it is to be understood that the present invention is not limited to the details of the illustrated embodiments, but may be otherwise embodied.

For instance, the annular groove 4b formed in each connector 4 may be replaced by two radial recesses or cutouts which are formed at diametrically opposite portions of the outer circumferential surface of the connector 4. In this case, the connector 4 is positioned relative to the hose connector holder 1 such that the two radial recesses are opposed to each other in the direction of width of the plate portion 2. Further, three or more recesses or cutouts may be formed in the outer circumferential surface of the connector 4. These radial recesses or cutouts should have the inclined surfaces 4c at least at the circumferential positions of the connector 4 which are diametrically opposite to each other. It is noted that the annular groove 4b is considered a kind of a recess formed in the outer circumferential surface of the connector 4. The annular protrusion 4b shown in FIG. 5 may be replaced by two or more protrusions formed on the outer circumferential surface of the connector 4.

In the illustrated embodiments, the leg portions 3 of the hose connector holder 1 have the engaging tabs 3a while the leg portions 7 of the pipe holder 5 have the engaging apertures 7a. However, the holders 1, 5 may be modified such that the leg portions 3 have engaging apertures while the leg portions 7 have engaging tabs. Further, these engaging tabs and apertures may be replaced by other fixing or fastening means such as screws.

It will be understood that the present invention may be embodied with various other changes, modifications and improvements, which may occur to those skilled in the art, without departing from the spirit and scope of the invention defined in the following claims:

What is claimed is:

1. A cluster hose-pipe connector device for connecting a plurality of hoses and a plurality of pipes, comprising:

a hose connector holder including a first plate portion, and
        a pair of first leg portions which extend from opposite longitudinal ends of said first plate portion in a first direction substantially perpendicular to a longitudinal direction of said first plate portion, said first plate portion having a plurality of openings formed through said first plate portion, each of said first leg portions having first engaging means;

a plurality of connectors for connecting said plurality of hoses and said plurality of pipes, each of said connectors having a pipe fitting hole and being fixed to said first plate portion, in engagement with a corresponding one of said openings, such that said pipe fitting hole is open in said first direction; and a pipe holder including a second plate portion, and a pair of second leg portions which extend from opposite longitudinal ends of said second plate portion in a second direction substantially perpendicular to a longitudinal direction of said second plate portion, each of said second leg portions having second engaging means engageable with said first engaging means, and wherein said plurality of pipes are secured to a surface of said second plate portion such that said pipes extend perpendicularly to a longitudinal direction of said second plate portion and in parallel to said surface of said second plate portion, said hose connector holder and said pipe holder being assembled together such that a plane of said first plate portion is substantially perpendicular to a plane of said second plate portion, and such that said end portions of said pipes are inserted in said pipe fitting holes while said first and second engaging means engage each other.

2. A cluster hose-pipe connector device according to claim 1, wherein said first engaging means comprises a protrusion extending from each of said pair of first leg portions in said longitudinal direction of said first plate portion, while said second engaging means comprises means for defining a portion engageable with said protrusion.

3. A cluster hose-pipe connector device according to claim 1, wherein each of said plurality of openings is an elliptical hole having a minor dimension in a direction perpendicular to said longitudinal direction of said first plate portion, and a major dimension in said longitudinal direction of said first plate portion, said major dimension being larger than said minor dimension, and a part of said first plate portion defining said each elliptical has a first engaging portion while each of said connectors has a second engaging portion which is engageable with said first engaging portion.

4. A cluster hose-pipe connector device according to claim 3, wherein said second engaging portion has at least one recess which is formed in an outer circumferential surface of said each connector and engageable with said first engaging portion, said at least one recess being partially defined by two shoulder surfaces which are opposed to each other in said first direction and which are inclined with respect to a plane parallel to said first plate portion, in respective opposite directions away from each other.

5. A cluster hose-pipe connector device according to claim 3, wherein said first engaging portion has at least one recess open in said each elliptical hole, while said second engaging portion has at least one protrusion which is formed on an outer circumferential surface of said each connector and engageable with said at least one recess, said at least one recess being partially defined by two shoulder surfaces which are opposed to each other said first direction and which are inclined with respect to a plane parallel to said first plate portion, in respective opposite directions away from each other.

6. A cluster hose-pipe connector device according to claim 1, wherein said plurality of openings are arranged in a straight row parallel to said longitudinal direction of said first plate portion, while said plurality of pipes are arranged in a straight row parallel to said longitudinal direction of said second plate portion.

7. A cluster hose-pipe connector device according to claim 6, wherein said plurality of openings are spaced apart from each other at a predetermined spacing pitch in said longitudinal direction of said first plate portion, while said plurality of pipes are spaced apart from each other at said predetermined spacing pitch in said longitudinal direction of said second plate portion.

8. A cluster hose-pipe connector device according to claim 1, wherein said hose connector holder is made of a synthetic resin, while said pipe holder and said pipes are made of metallic materials.

9. A cluster hose-pipe connector device according to claim 1, wherein said each connector has a sealing member disposed in said pipe fitting hole.

* * * * *